(12) United States Patent
Kobold

(10) Patent No.: US 9,208,386 B1
(45) Date of Patent: Dec. 8, 2015

(54) CROWD STATE CHARACTERIZATION SYSTEM AND METHOD

(75) Inventor: Michael C. Kobold, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1005 days.

(21) Appl. No.: 13/385,030

(22) Filed: Jan. 9, 2012

(51) Int. Cl.
*G06K 9/00* (2006.01)

(52) U.S. Cl.
CPC ........ *G06K 9/00778* (2013.01); *G06K 9/00624* (2013.01); *G06K 9/00711* (2013.01)

(58) Field of Classification Search
None
See application file for complete search history.

(56) References Cited

U.S. PATENT DOCUMENTS

| 8,565,228 | B1 * | 10/2013 | Howard | 370/389 |
| 2009/0322875 | A1 * | 12/2009 | Toyoshima | 348/143 |

OTHER PUBLICATIONS

Pham et al., "Real-Time Posture Analysis in a Crowd using Thermal Imagin", Jun. 22, 2007, IEEE Conference on Computer Vision and Pattern Recognition, 2007.CVPR '07, pp. 1-8.*
Xiang et al., "Abnormal Crowd Behavior Detection Based on the Energy Model", Jun. 8, 2011, IEEE International Conference on Information and Automation (ICIA), 2011, pp. 495-500.*

* cited by examiner

*Primary Examiner* — Mehrdad Dastouri
*Assistant Examiner* — James M Anderson, II
(74) *Attorney, Agent, or Firm* — James T. Shepherd

(57) ABSTRACT

A crowd state characterization system utilizes a plurality of processors to analyze video streams from numerous videos to select videos and/or video frames of interest. The processors digitize dismounts such as pedestrians and the like and then analyze the digitized pedestrians. The frames of video are characterized in terms of entropy related to discordant motion and enthalpy related to energy. A selector can then select from among numerous videos to allow observation of videos numerically determined to be of interest.

12 Claims, 8 Drawing Sheets

CROWD STATE CHARACTERIZATION SYSTEM AND METHOD

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates generally to crowd surveillance and, more specifically, to an automated crowd surveillance system that mitigates information overload by producing metrics related to the underlying crowd sociology.

(2) Description of the Prior Art

Prior art crowd surveillance uses several monitor banks and human monitors to switch video feed to camera sites, which are too numerous to display at one time. With hundreds or thousands of displays available, command centers cannot effectively discriminate between benign, dangerous, and anomalous crowd situations. Automated pedestrian and vehicle detection systems simply produce a sequence of maps of the detected pedestrians and vehicles at particular time frames.

The prior art does not show the features of the present invention, which reduces the megapixel images in video frames to a few variables relevant to the state of the crowd, and automatically directs operators to the particular cameras which may be of interest from the numerous available camera feeds available. Accordingly, those of skill in the art will appreciate the present invention, which addresses the above discussed problems.

SUMMARY OF THE INVENTION

It is an object of the present invention to provide an improved crowd characterization system.

Another possible object of the present invention is to provide a system that mitigates information overload for operators who manage crowd surveillance.

Another possible object of the invention is to provide a crowd surveillance system that can detect rapid changes in crowd behavior.

Another possible object of the invention is to provide a crowd surveillance system that requires less storage space than previous systems.

Other objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

In accordance with the present invention, a system is provided for automatically characterizing a plurality of video streams. The present invention may comprise elements such as, but not limited to, a plurality of cameras that produce a plurality of video streams and a plurality of processors (such as ASIC's) for receiving the plurality of video streams, each video stream comprising frames of video.

Each of the plurality of processors, for example Field Programmable Gated Arrays (FPGAs), is programmed for digitizing a plurality of dismounts within the video streams and producing numerical characterizations for the digitized dismounts. The numerical characterizations represent an enthalpy, related to an energy of the dismounts, and entropy, related to a discordance of motion of the dismounts with respect to a comparison of the frames of video, where the video streams are numerically characterized using both the enthalpy and entropy.

In one embodiment, the plurality of processors is operable for determining crowd region of influence related to a density of the dismounts, and a numerical value for a crowd temperature from the region of influence, a number of the dismounts, and the enthalpy and entropy.

The plurality of cameras may comprise over 50 or 100 cameras, and may further comprise a selector module operable to select a particular feed of the video streams based on threshold values for the numerical characterizations for the enthalpy and entropy.

In one embodiment, the processors may comprise a detector module operable for detecting and digitizing the dismounts within the video feeds, and a crowd module, which determines the numerical characterizations of the dismounts for the enthalpy and entropy.

In another embodiment, the system may further comprise a plurality of camera housings for the cameras, whereby each of the plurality of processors is mounted to respective camera housings.

The crowd state characterization system may further comprise a detector module for each of the processors, wherein the detector module may comprise a training module, which detects initial test dismounts in a video stream which is known to comprise few or no dismounts. The initial test dismounts are subtracted from subsequently detected dismounts before characterizing the number of dismounts for the enthalpy and entropy.

In another embodiment, the present invention provides a method for automatically characterizing a plurality of video streams. Steps in the method may comprise programming multiple FPGA processors for processing a plurality of video streams, wherein each of the processors are programmed for digitizing a plurality of dismounts within the video streams.

Other steps may comprise programming the processors for producing numerical characterizations for the digitized dismounts, and programming the numerical characterizations to represent an enthalpy, related to an energy of the dismounts, and an entropy, related to a discordance of motion of the dismounts with respect to a comparison of the frames of video.

In this way, the frames or groups of frames of the video streams are numerically characterized for the enthalpy and entropy. The operators can select those for viewing. The method may comprise mounting the processors into a plurality of cameras that produce the video streams.

The method provides for use of a plurality of cameras, which may comprise over 50 cameras, and may further comprise providing a selector module operable to select a particular feed of the video streams based on a plurality of threshold values for the numerical characterizations for the enthalpy and entropy. The method may further comprise programming the processors for determining a region of influence related to a density of the dismounts, and a numerical value for a crowd temperature from the size of the region of influence, a number of the dismounts, and the enthalpy and entropy.

The method may comprise providing that each of the processors comprise a detector module operable for detecting and digitizing the dismounts within the video feeds, and a crowd module, which determines the numerical characterizations of the dismounts for the enthalpy and entropy.

The method may further comprise providing a detector module for each of the processors, wherein the detector module may comprise a training module, which detects initial test dismounts in a video, which are known to comprise few or no actual dismounts, whereupon the initial test dismounts are subtracted from subsequently detected dismounts.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
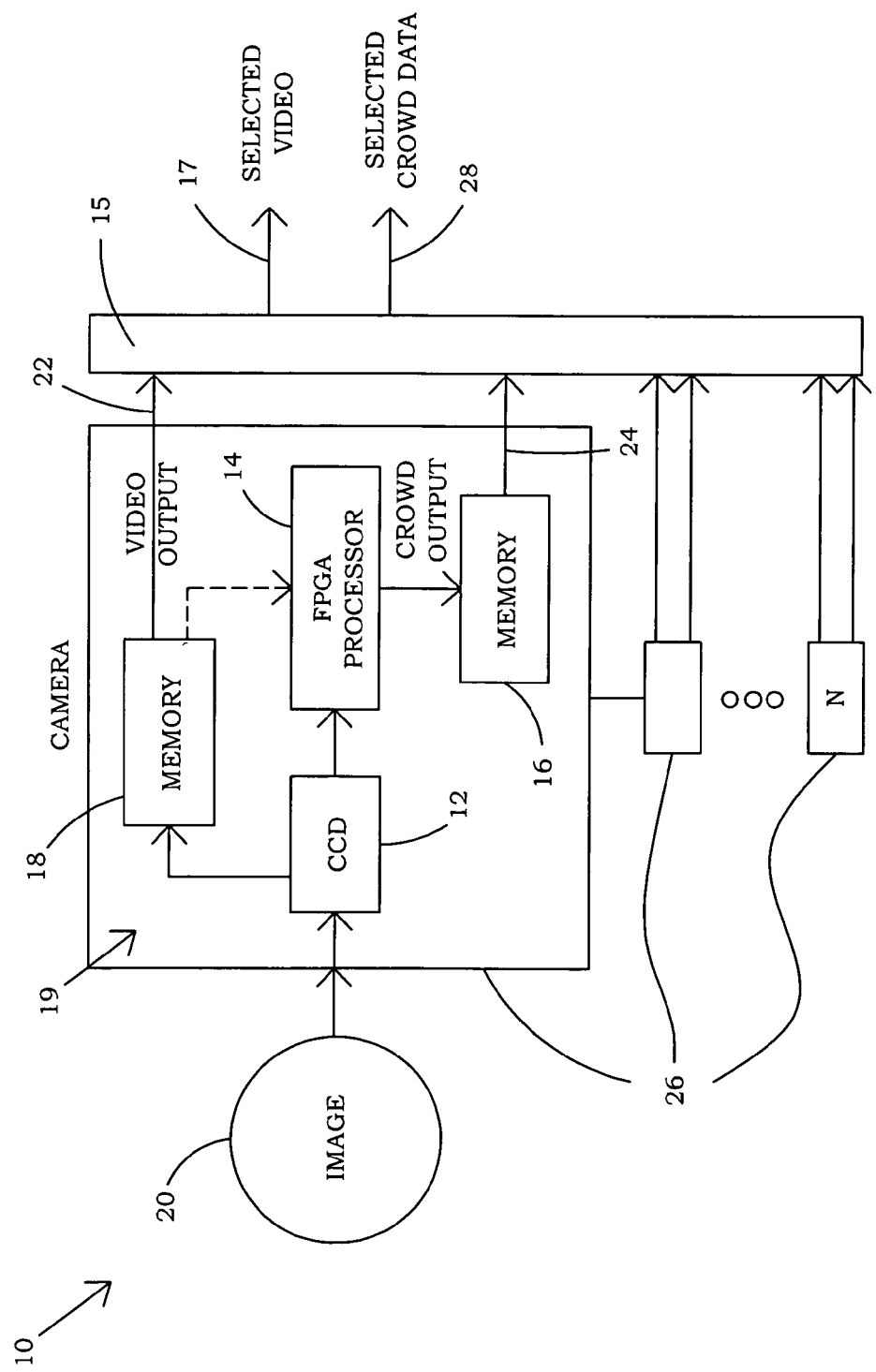
FIG. 1 is a block diagram, which provides hardware in each of N crowd surveillance cameras, which may typically comprise large numbers of cameras, each being operable to characterize a state of a crowd in accordance with one possible embodiment of the present invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention may be utilized to sort through numerous or large numbers of video streams to detect anomalous crowd behavior. By large numbers, it is meant herein to be greater than 50 video streams although hundreds or thousands of video steams may be present for analysis or observation, preferably in real time.

In one presently preferred embodiment, the detection methods utilize hardware/software components which are able to quickly characterize each frame of data by reducing the information from megabytes to a relatively small number of bytes. Software may also be utilized but may not operate as quickly. In one embodiment, FPGA integrated circuits are programmed to analyze the data from a video stream in real time either at each camera or at central locations that receive the video streams. Software alone may also be utilized but may not operate as quickly.

Detection programs can be utilized to digitize vehicles, pedestrians, walkers, runners, people hiding, people stationary, body positions, facial expressions, and the relative changes of the detected movement. This is sometimes referred to by those of skill and herein as digitizing dismounts, which refers to the detected pedestrians, vehicles, features thereof, and the like. The digitization system uses the current state of the art in pedestrian detection based on variants of the AdaBoost algorithm and/or the Viola-Jones cascade ('VJ cascade').

In the first detectors of the cascade, it is desirable to select all potential dismounts. It has been found that the false alarm rate is typically not small. However, detection 'size' has not been found to be a concern. Accordingly, it is desirable to have small size but 'powerful' detectors. The present system uses high probability of detection (high detection 'power') algorithms. False alarms are dealt with more effectively by exclusion in subsequent high power—moderate size stages of the cascade. Initial choices for detectors include Kullback and Fisher Linear Discriminant (FLD). But the choice of detector is necessarily left to the user due to advancing competing methods in the detection fields.

Once digitized, thermodynamic equations may be utilized to analyze the resulting digitized detected dismounts such as pedestrians and the like in terms of "crowd entropy," "crowd enthalpy," and "crowd temperature."

For purposes of the present invention, the term "enthalpy" is utilized to represent the sum of "energy" of the digitized dismounts. For example, a large number of detected dismounts with faster motion would result in a higher "crowd enthalpy." A smaller number of detected dismounts moving in slower motion would result in a lower enthalpy. Likewise, a large number of dismounts that are relatively stationary results in a relatively lower crowd enthalpy.

While many equations could be utilized to represent the crowd enthalpy mathematically, a few representative thermodynamic equations related to entropy are provided herein as non-limiting examples. As well, the invention may comprise equations to represent the energy in other ways that might not be classical thermodynamic equations. It will be appreciated that one of skill in the art can provide programming that detects the motion of the dismounts, the speed thereof, the number of dismounts, and determines an overall "crowd enthalpy."

"Crowd entropy" as used herein refers to the type of motion of the digitized dismounts. Very generally, consistent movement of each digitized dismount and/or flowing movement whereby the dismounts move relatively in the same direction results in a low crowd entropy whereas inconsistent motion and/or different types of motion or direction of motions of the digitized dismounts results in higher crowd entropy. In accordance with the present invention, thermodynamic equations relating to enthalpy are used as non-limiting examples. However, it will be understood that one of skill in the art can provide programming that analyzes the movement of the dismounts to determine regularity of movement of particular dismounts as well the degree of different movements' of the dismounts to thereby provide a crowd entropy in accordance with the present invention.

Figure 2:
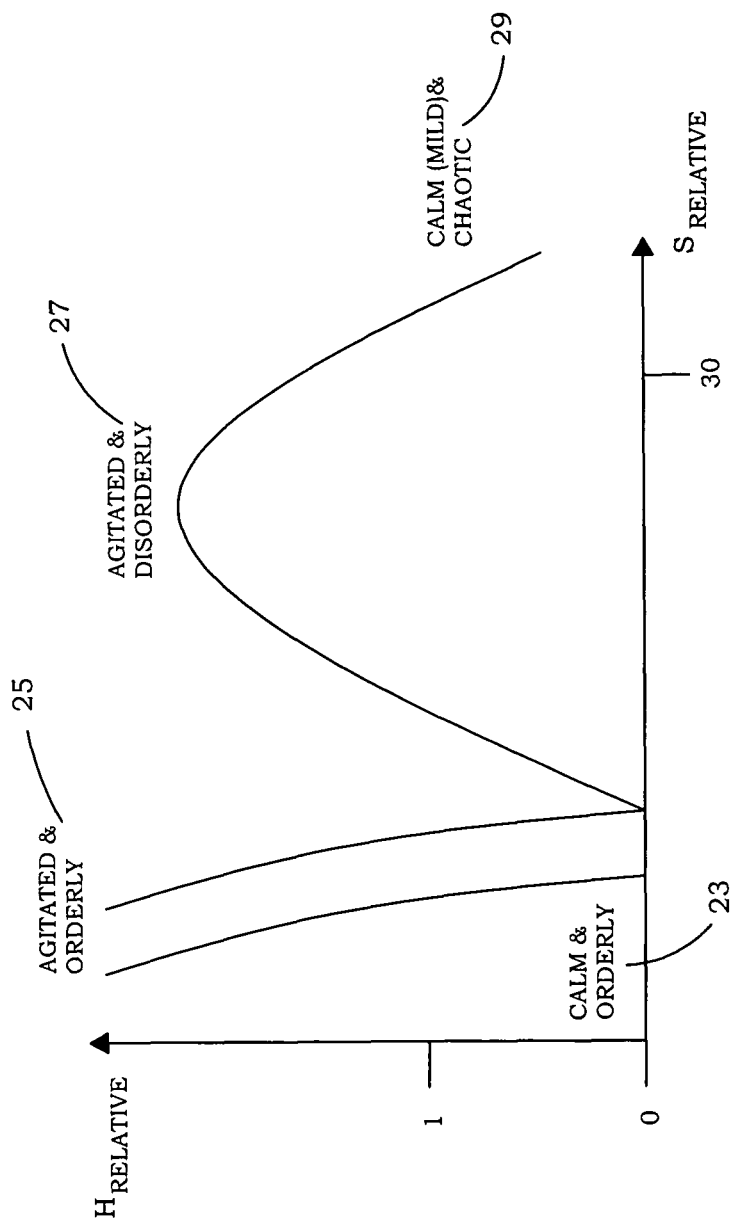
FIG. 2 is graph of variables calculated by software/hardware which characterize a crowd and permit the use of thresholds to detect certain crowd characterizations in accordance' with another possible embodiment of the invention.

FIG. 2 is a graph of the entropy and enthalpy values of possible images comprised of the digitized dismounts. Enthalpy (H) is plotted on the vertical axis and Entropy (S) is plotted along the horizontal axis. Based on the enthalpy and entropy values assigned to an image, which may typically comprise frames of a video stream, representative pictures or video of the crowd can optionally be displayed on the graph, if desired.

The camera images can be characterized mathematically by the hardware/software discussed herein based on where they are plotted on the graph. Calm and orderly images as indicated at 23 have low entropy and low enthalpy values. For example, a large crowd that is sitting in an auditorium might be classified as calm and orderly. Because the digitized dismounts do not have significant movement, the energy or enthalpy is low. Likewise, because the digitized dismounts are relatively organized in place in their seats, the entropy would also be low.

On the other hand, a digitized image of dismounts comprising a large group of people starting a marathon would result in high enthalpy due to their combined significant motion or energy. However, due to relatively consistent, repetitive and/or flowing motion, the digitized dismounts would be classified mathematically as orderly, resulting in a classification of agitated and orderly as indicated at 25. Agitated and orderly images, as might be used here as a classification, have relatively low entropy values, but high enthalpy value.

Agitated and disorderly 27 images have high entropy and high enthalpy values. For example, relatively large numbers of digitized dismounts going quickly and irregularly in different directions, with quickly varying motions of the individual digitized dismounts, as may occur during a riot, would result in an agitated and disorderly classification. Thus, a large number of quickly moving digitized dismounts moving in relatively different directions or with discordant or uneven movements would result in this classification.

Calm and chaotic 29 images have high entropy value but low enthalpy value. For example, digitized examples of a small meeting in a park breaking up where participants walk off in different directions might be characterized in this way. The relatively small group is moving rather slowly giving readings or mathematical classifications of low energy or enthalpy. However, the different paths taken by the different participants may result in a relatively higher entropy.

Crowds with particular characteristics cluster into different locations on the (H,S) plot as depicted in the graph based on these labels, in accordance with one possible embodiment of the invention. In accordance with the present invention, mathematical triggers or thresholds may be set, e.g. enthalpy greater than 1 and entropy greater than 15, to direct attention of the human monitors to the particular video streams with such values when it is desired, for example, to focus on crowds more likely to be in a state of riot. The selection may by automatic where a video automatically pops up or partially automatic where the system notifies an operator, who then chooses whether or not to view the video.

As well, the type of crowd state for viewing may be selectable so that the thresholds for calm and orderly, agitated and orderly, calm and chaotic, could be similarly detected with appropriate triggers. In this way, numerous streams of video can be better monitored for the selected behavior of interest.

In another embodiment, a crowd temperature may be calculated. The processor is programmed to detect a crowd volume or region of influence based on a selected density of digitized dropouts. For example, the processor may detect a size of crowd volume or region where the density exceeds a selected value. The size of this region might then be measured. Utilizing the size or crowd volume, the number of digitized dismounts, the enthalpy and the entropy, a "crowd temperature" is numerically determined. In this case use of a thermodynamic entropy ('Gibb's entropy') may model sociology better and more theoretically consistently but an information entropy (Shannon's entropy) may be adequate for crowd classification. Either entropy may be programmed by the user with algorithms of their choice to exploit advances in computation. Thus, frames of a video stream may be characterized by a relatively small amount of information, e.g., the crowd temperature, entropy, and enthalpy. In terms of bytes, this can be expressed with greatly reduced bandwidth.

FIG. 1 depicts a schematic diagram for crowd state characterization system 10 utilizing thermodynamic analogues. System 10 may typically comprise a large number N of cameras 26. N is typically larger than 50 cameras but may comprise hundreds or thousands of cameras. Thus, it is difficult for human operators to monitor the volume of video streams in real time.

An enlarged internal camera construction 19 shows a representative block diagram for a typical camera as used herein. Camera construction 19 may comprise a circuit board which electrically connects with an imaging sensor which could be a charge coupled device, or CCD 12, that electronically captures image 20 in terms of frames of a video stream. CCD 12 may transmit image 20 to memory unit 18 and/or provide camera output video 22 frames of image 20, which the camera captured. CCD 12 also feeds image 20 to a Field Programmable Gated Array processor (FPGA) 14 in accordance with the present invention. It will be noted that the FPGA 14 may be located at different location than the camera but in this example the FPGA 14 is located at the camera to analyze the raw data. The FPGA 14 is programmed to analyze the video stream to characterize the crowd in the manner discussed above. However, it will be appreciated that software analysis may also be provided if desired. Generally, specifically designed hardware operates much faster than software.

Accordingly, the FPGA 14 may be a form of application specific integrated circuit (ASIC) that is programmed to replace frames of video from image 20 with three values: entropy, enthalpy, and temperature. These values may then be stored in second memory unit 16 of the camera and/or output as crowd data 24.

Selector 15 may be utilized to compare the crowd data to select a particular video stream 17 and/or selected crowd data 28 in accordance with one possible embodiment of the invention based on the desired threshold levels for entropy, enthalpy, and/or temperature as discussed above. In this way, it is possible for a limited number of operators to manage a large number of video streams.

Figure 3:
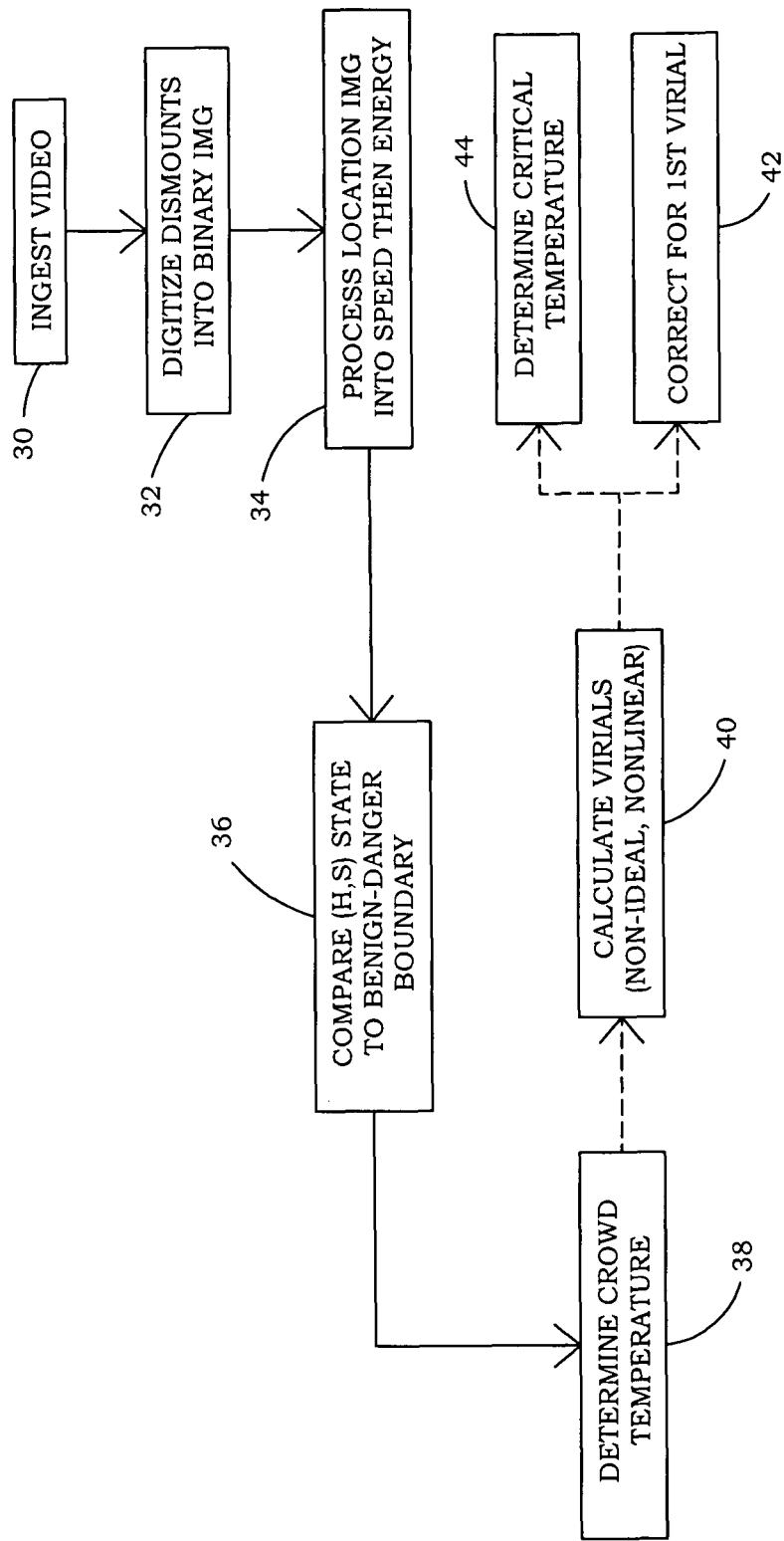
FIG. 3 is a flow diagram wherein dismounts, which may include people in various states such as hiding, stationary, moving, or in other states, are characterized in accordance with the graph of FIG. 2 in accordance with one possible embodiment of the invention.

FIG. 3 is a flow chart for a method of crowd state characterization utilized in FPGA processor 14 as described above utilizing a thermodynamic analogues system. During ingest video step 30, the camera, such as camera 10, inputs raw image 20 to processor 14. In step 32, video is digitized into binary images based on a variant of the AdaBoost algorithm, the Viola-Jones cascade.

The Viola-Jones cascade is a state of the art algorithm in pedestrian, or dismount detection. In the first detector of the cascade, detection size is not as significant a concern as that of making sure to select all potential dismounts. False alarms, such as mechanical movement, are dealt with more effectively by exclusion in subsequent high power-moderate size stages of the cascade. Possible detectors include Kullback and Fisher Linear Discriminant (FLD) based on their proven ability for pedestrian, facial, and vehicle detection and location, in accordance with one possible embodiment of the invention.

During step 34, the location image is processed to provide the overall energy and direction of motion of the digitized dismounts. In this step, binary images are processed and used to calculate the enthalpy ($H_{crowd}$) and entropy ($S_{crowd}$) values, which are two presently preferred basic parameters for the model.

In one embodiment, a free energy choice of enthalpy is a speed of calculation choice where mechanical interaction is accounted for in the method by multiplying the volume ($V_{crowd}$) times the sensitivity of the average and fluctuation internal energy ($u_o$ and $\Delta u$) to changes in volume.

In one possible embodiment, enthalpy might be calculated by multiplying the crowd mass, $m_{crowd}$, times the following equation:

$$h_{crowd}(\tau_t) \approx$$

$$u_o + \frac{1}{2\sum_{t'=t_o}^{t_f} R_{(x,y)}(\tau_{t'})} \sum_{i=1}^{N} R_{(x,y)_i}(\tau_t) - V_{crowd}\left(\frac{\partial u_o}{\partial V_{crowd}}\right) - V_{crowd}\sum_{i=1}^{N} \frac{\partial \Delta u_i}{\partial V_{crowd}}$$

Likewise, in one possible embodiment, entropy value could be calculated using the following formula:

$$S_{crowd} \approx k_{crowd} V \rho_{2-D} \left[ S_{crowd} \ln\left(\frac{\rho_{2-D}}{\lambda_{pers}}\right) \right]$$

The enthalpy ($H_{crowd}$) and entropy ($S_{crowd}$) values are then analyzed to determine the behavioral state of the crowd.

In step 36, a comparison of the (H,S) state to benign-danger boundary is conducted. The enthalpy-entropy state provides a metric to be used where a set of approved, or benign, states are defined in the system analysis, as well as a set of danger states. In analogy to estimation theory, the map of these states provides the basis vectors for a support vector machine (SVM) to define the boundary of operation using theoretically clean methods from learning theory. These values are used to decide if the crowd behavior is benign, anomalous, or changing dangerously.

Those with skill in the art will appreciate the invention as improving upon previous crowd surveillance methods that used several monitor banks and a human monitor to switch video feed to camera sites which were too numerous to display at one time. Even if thousands of displays were available, command centers could not effectively disseminate all the images to determine the crowd's current behavior and if that behavior was soon to change.

Enthalpy and entropy values are utilized in step 38 to determine a crowd temperature. Crowd temperature ($T_{crowd}$) is determined from the assumed region of influence (crowd fluid 'volume'), density or number of dismounts, and enthalpy ($H_{crowd}$) and entropy ($S_{crowd}$) values. In deriving crowd temperature, the sociological nature of the crowd is measured. This crowd temperature, which is more than physical velocity, is of use to sociological studies and more accurately provides a measure of crowd temperature than using the specific internal energy, represented by the equation: $U_{crowd} = (\Delta v_{crowd} + v_{crowd})2/2$.

'Specific' indicates a value is in terms of per unit mass, used here to avoid direct use of inertial effects that resist motion of the crowd. Variable symbols for 'specific' quantities are shown as the lower case letter of the non-specific full quantity. For example, specific crowd enthalpy is $h_{crowd} = H_{crowd}/m_{crowd}$. The crowd mass ($m_{crowd}$) is necessarily different from the physical dismount masses in order to take sociological and socio-psychological effects on their physical velocities into account.

In this embodiment, the crowd temperature provides a convenient metric with a simple hot-cold perception. In combination with other crowd state metrics, the crowd temperature provides a feature fusion capability, in accordance with one possible embodiment of the invention.

In step 38 a crowd temperature is determined as discussed above. In step 40 non-ideal, nonlinear values are calculated to be used in analysis of crowd data 24 from FIG. 1. The final two steps 42 and 44 involve correcting the first virial 42 and then determining a critical crowd temperature 44.

The above steps are discussed in greater detail hereinbelow.

A useful feature of the present invention, is that the enthalpy, the entropy, and the crowd temperatures are three floating point numbers with orders of magnitude requiring less data storage space than even compressed full video streams. Typical data sizes would be 6 to 12 bytes compared with megapixel images that change every with every unit time step. Therefore, the status of more image streams is stored in memory from which the method can analyze images and determine the behavioral state of the crowd as the crowd changes in time.

Figure 4:
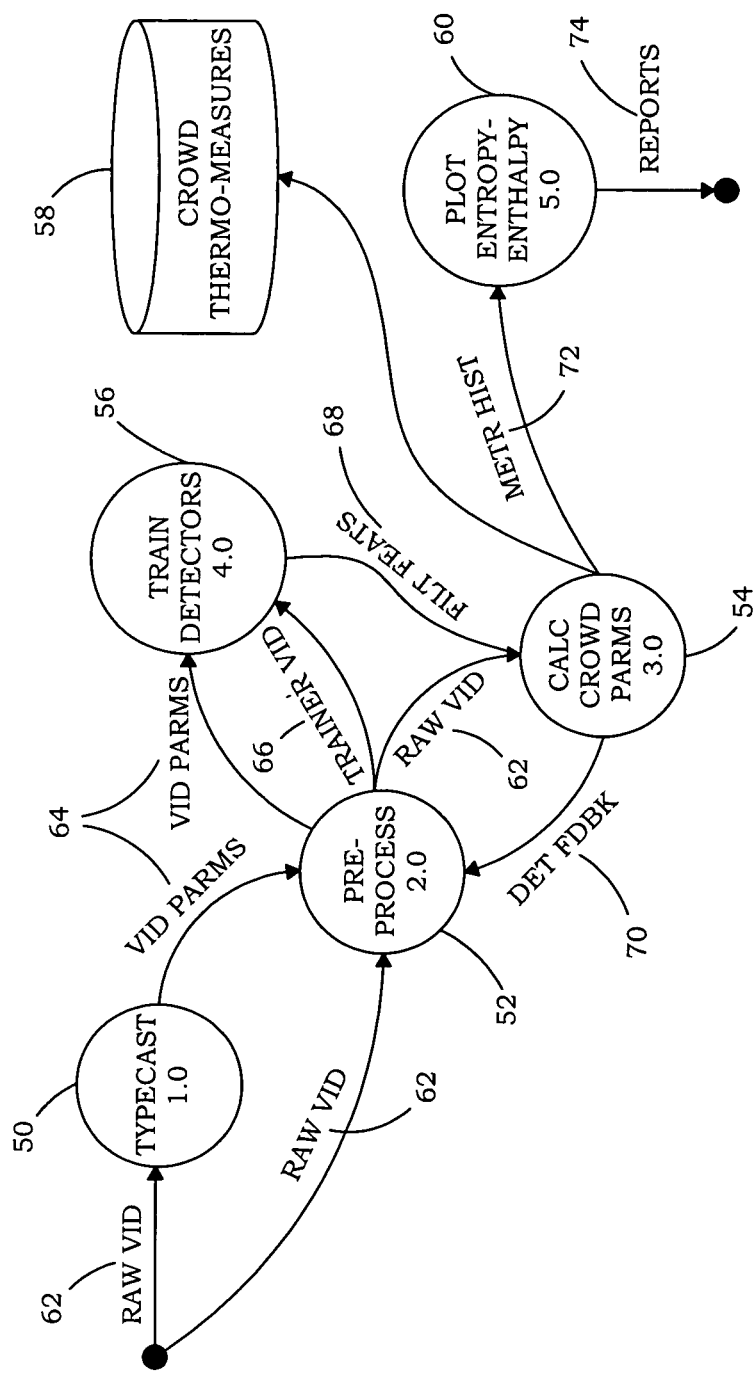
FIG. 4 is a flow diagram of data between modules utilized for crowd state characterization in terms of the graph of FIG. 2 and overall temperature of a crowd in accordance with one possible embodiment of the invention.

FIG. 4 discloses a basic module overview for operation of the device in accordance with one possible embodiment of the baseline algorithm. Raw video 62 input from camera 10 is sent through module 50, which calculates parameters of the video, such as density of crowd and features of the pedestrians. Video parameters 64 are then forwarded with raw video 62 to pre-processing module 52. Video parameter types may include features such as head bob, full body, dense crowds, sparse crowds, moderate crowds, and the like. Raw video 62 is processed by module 54, which calculates crowd parameters, as shown in more detail in FIGS. 6, 7, and 8. Module 54 sends detector feedback 70 to pre-processing module 52. Video parameters 64 and trainer video 66 are processed through module 56, utilized to train detectors and discussed hereinafter with respect to FIG. 5. Module 56 provides filter features 68, which are important in the calculation of crowd parameters, as discussed hereinafter, for use in module 54.

Crowd temperature or thermo-measure 58 is then computed from entropy and enthalpy values and stored. Plot entropy-enthalpy module 60 plots the image values on a graph based on metric histories 72 of crowds, as discussed hereinbefore in connection with FIG. 2. Reports 74 derived from such analysis advises a user on the behavioral state of the crowd as compared to other crowd states, in accordance with one possible embodiment of the invention.

Figure 5:
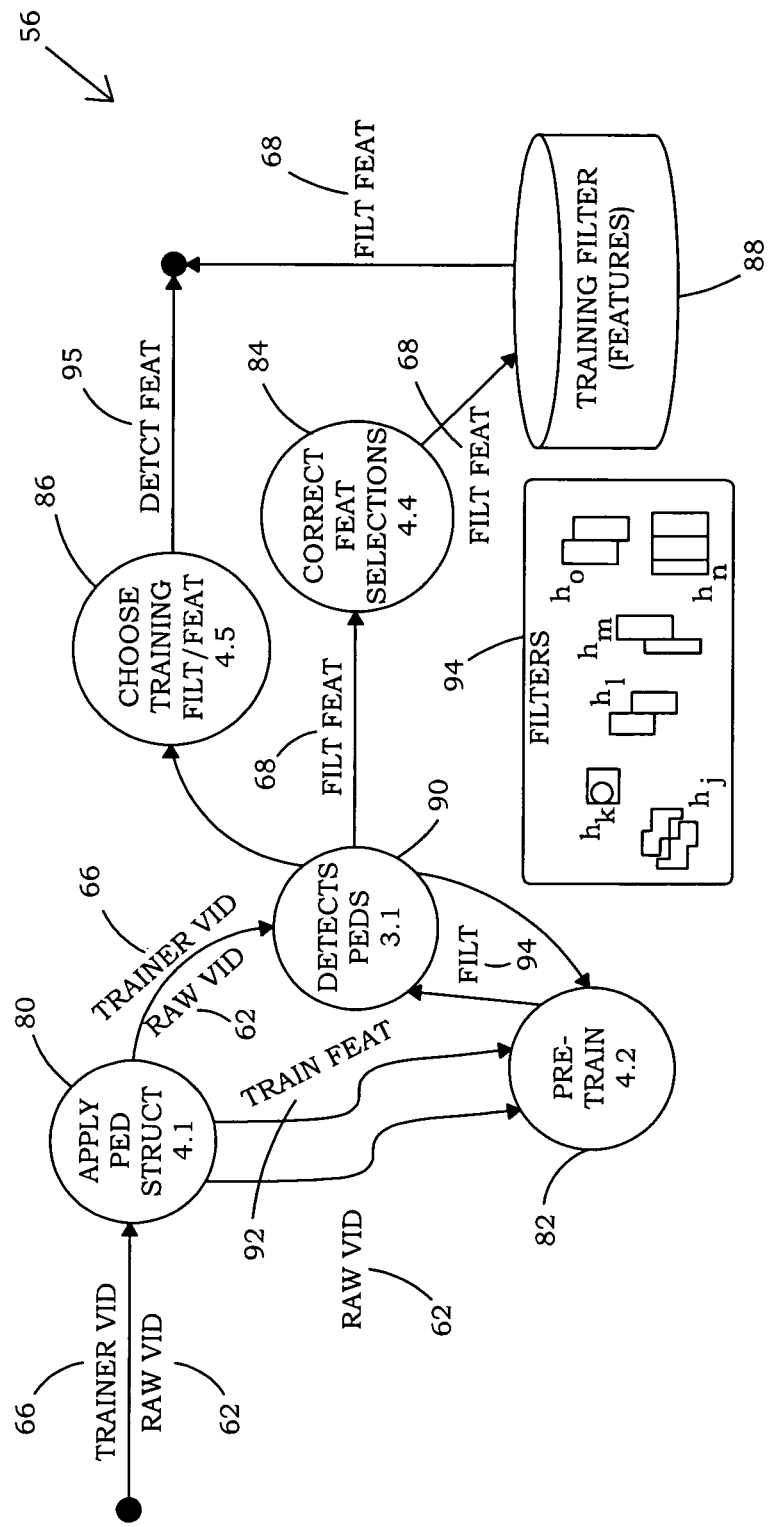
FIG. 5 is a flow diagram of data between sub modules related to digitizing dismounts (pedestrians and other characters of interest) in accordance with one possible embodiment of the invention.

FIG. 5 is a more detailed flow chart diagram of the train detectors module 56 in the baseline method. Trainer video 66 and raw video 62 are processed through module 80, which applies a pedestrian structure. From module 80, data is forwarded to two separate locations. First, trainer video 66 and raw video 62 are transmitted to module 90 where detected pedestrians for use in module 54 of FIG. 4 for calculating crowd parameters are needed. Raw video 62 and trained features 92 are sent to module 82 for pre-training.

During training, for example, a video of an area at a time it is known to be empty without dismounts may be utilized wherein any detected dismounts would be false. Thus, these could be eliminated. Likewise, known pedestrians could be utilized for training purposes.

Module 82 transmits filters 94 to module 90 for detecting pedestrians used to calculate crowd parameters in module 54 of FIG. 4. Filters 94 are representative of detected pedestrians. This module filters out parts of the image irrelevant in determining crowd behavior, as discussed hereinbefore.

Common filters 94 may be represented mathematically as hj, hk, hl, hm, hn, and ho. Filter features 68 are processed through module 84 for correcting feature selections, which are then sent to training filter 88. Module 86 is used to choose training filters and outputs detection features 95, in accordance with one possible embodiment of the invention.

Figure 6:
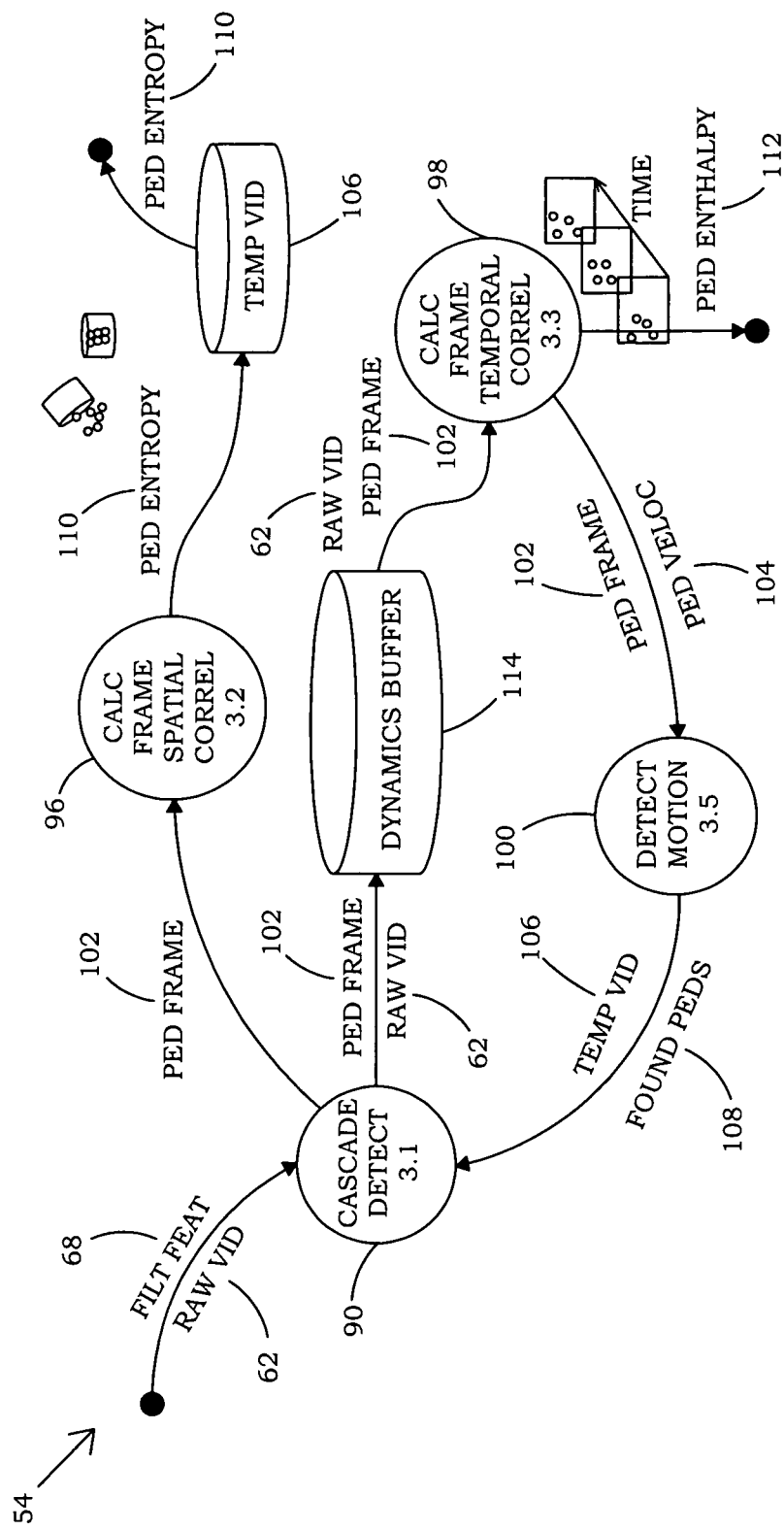
FIG. 6 is a flow diagram of data between sub modules related crowd parameters for detecting pedestrian enthalpy in accordance with one possible embodiment of the invention.

FIG. 6 shows more detail for module 54, which calculates crowd parameters in FIG. 4. Filter features 68 and raw video 62 are processed through module 90 cascade detectors 90, which applies the Viola-Jones cascade to determine the number of pedestrians, or dismounts, as discussed herein. Data is then forwarded to separate modules to determine entropy and enthalpy values.

Pedestrian frame value 102 is sent to module 96 to calculate frame spatial correlation, which then determines pedestrian entropy 110 and forwards this data to temp video 106 and then to next step in the baseline method. Pedestrian frame value 102 and raw video 62 are processed through dynamics buffer 114 en route to substep module 98 to calculate frame temporal correlation. Module 98 determines pedestrian enthalpy 112 and also transmits pedestrian frame 102 and pedestrian velocities 104 values to module 100, which detects motion. Module 100 transmits temporary video 106 and found pedestrians 108 back to module 90 cascade detectors, which reiterates the operation, in accordance with one possible embodiment of the invention.

Figure 7:
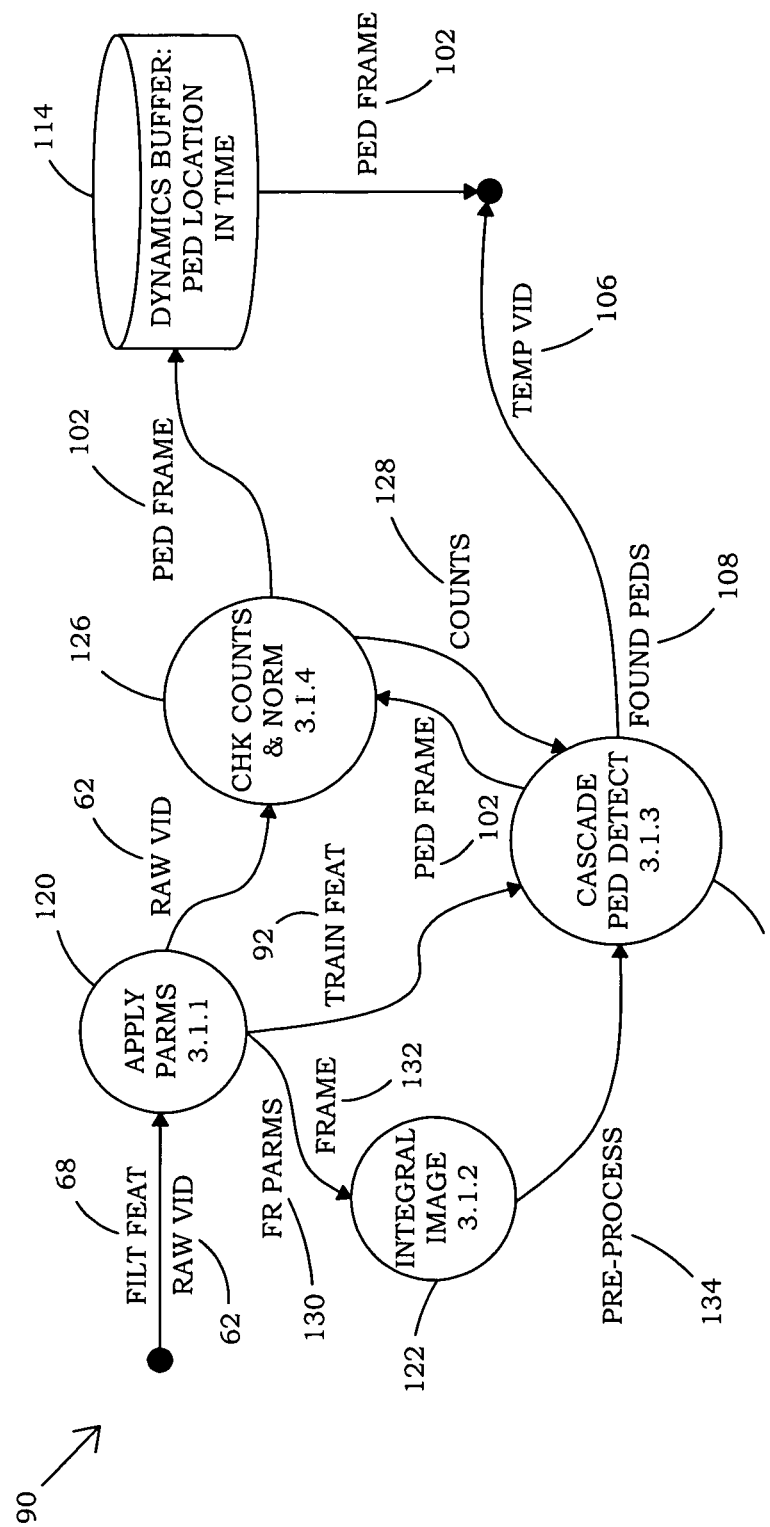
FIG. 7 is a flow diagram of data between sub modules related to cascade detectors in accordance with one possible embodiment of the invention.

FIG. 7 shows additional operation details of module 90 of FIG. 6, or the cascade detectors. Filter features 68 and raw video 62 are sent to module 120, which applies parameters and transmits data to several modules. Filter parameters 130 and frame values 132 are sent to integral image module 122, which then processes the values and forwards pre-process value 134 to cascade pedestrian detectors module 124. The integral image module 122 calculates an integral value to represent the image based on the equation: $H(-E1,-E2)=[Icorr(E1,E2)]/[max(Icorr) \cdot Iraw(E1,E2)]$ in accordance with one possible embodiment of the invention.

Module 120 also forwards trained features 92 to module 124, which provides cascade pedestrian detectors. Raw video 62 is transmitted from module 120 to module 126 to check counts and normalize this information.

Module 124 and module 126 then exchange information to be used in their respective functions: pedestrian frame value 102 is sent to module 126 while counts value 128 is sent to module 124. Module 126 then determines pedestrian frame value 102, which passes through dynamics buffer 114 which tracks the pedestrian location in time before sending said value on to module 96. Module 124 sends found pedestrians 108 and temp video 106 values on to module 98, where values are determined by using Classic Viola-Jones algorithm in accordance with one possible embodiment of the invention. Other possible embodiments of the invention could use Multiple Instance Learners algorithms, such as MILboost or Noisy-OR.

Figure 8:
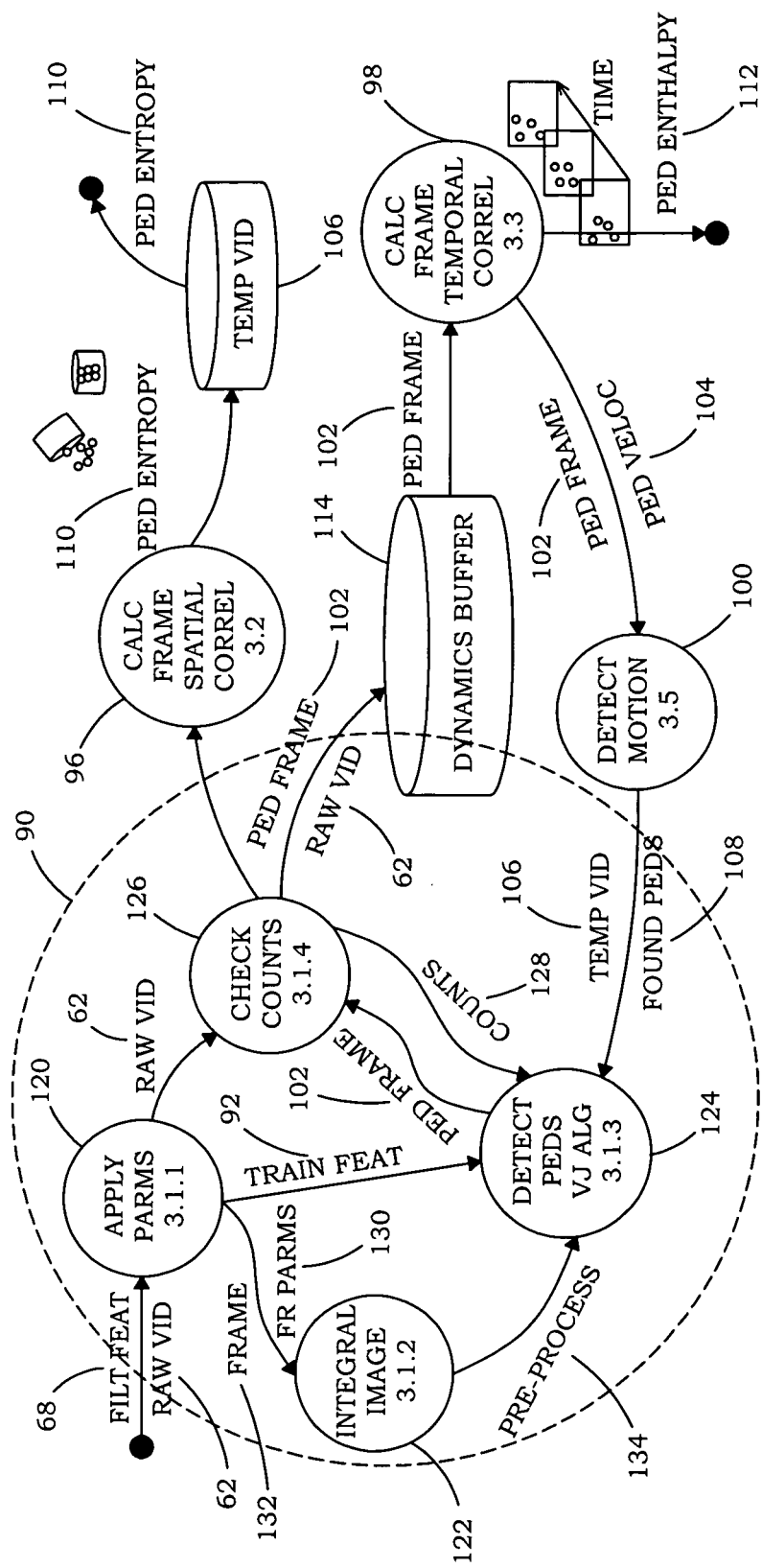
FIG. 8 is a flow diagram of data between sub modules wherein the cascade detectors are utilized to produce pedestrian entropy and pedestrian enthalpy in accordance with one possible embodiment of the invention.

FIG. 8 is an expanded view of module 54, which calculates crowd parameters as used in FIG. 4. Filter features 68 and raw video 62 are sent to module 120, which applies and transmits frame parameters data 130 to module 122, training features 92 to module 124, and raw video 62 to module 126. Module 126 checks counts and sends pedestrian frame value 102 to module 96, which calculates frame spatial correlation. Module 96 determines pedestrian entropy 110 to be used in estimating the crowd behavior. Module 126 receives pedestrian frame data 102 from module 124 and transmits counts data 128 to module 124. Module 126 sends raw video 62 through dynamics buffer 114 en route to module 98, which provides frame temporal correlation. Module 98 determines pedestrian enthalpy 112 used in determining crowd behavior as discussed herein. Module 98 also transmits pedestrian frame data 102 and pedestrian velocities data 104 to module 100, which detects motion. Module 100 transmits temporary video data 106 and found pedestrians data 108 back to module 124 cascade detectors, where the Viola-Jones cascade algorithm is applied to a new set of values. Accordingly, these modules or sub modules calculate crowd parameters, in accordance with one possible embodiment of the invention.

In another embodiment, if the cameras were focused on facial expressions, and the facial expressions were moving quickly, for example laughing at a joke, the associated frames of a sitting crowd might be characterized as having high enthalpy and entropy. Accordingly, the invention may be utilized to classify crowds for purposes that may not be associated with extreme behavior but rather variations of normal behavior.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A system for automatically characterizing a plurality of video streams, comprising:
a plurality of cameras that produce said plurality of video streams, each video stream comprising frames of video; and
a plurality of processors configured to receive said plurality of video streams, each of said plurality of processors being programmed for digitizing a plurality of dismounts within said plurality of video feeds, said plurality of processors being programmed for producing numerical characterizations for said plurality of dismounts in said frames of video of an enthalpy related to an energy of said plurality of dismounts and an entropy related to a discordance of motion of said plurality of dismounts with respect to a comparison of said frames of video, whereby each of said video streams is numerically characterized for said enthalpy and said entropy;
wherein said plurality of processors are programmed to determine crowd region of influence related to a density of said dismounts, and to produce a numerical value for a crowd temperature based on a size of said region of influence, a number of said dismounts and said enthalpy and said entropy.

2. The system of claim 1, wherein said plurality of cameras comprises over 50 cameras, and further comprising a selector module operable to select a particular of said plurality of video streams based on a plurality of threshold values for said numerical characterizations for said enthalpy and said entropy.

3. The system of claim 1, wherein each of said plurality of processors comprises a detector module operable for detecting and digitizing said plurality of dismounts within said plurality of video feeds, and a crowd module which determines said numerical characterizations of said plurality of dismounts for said enthalpy and said entropy.

4. The system of claim 1, further comprising a plurality of camera housings for said plurality of cameras, wherein said plurality of processors is mounted to said plurality of camera housings.

5. The system of claim 1, further comprising a detector module for each of said plurality of processors, wherein said detector module comprises a training module, which detects initial test dismounts in a video which is known to comprise few or no dismounts, whereupon said initial test dismounts are subtracted from subsequently detected dismounts.

6. The system of claim 1, wherein said processors are Field Programmable Gated Arrays (FPGAs).

7. A method for automatically characterizing a plurality of video streams, comprising:
programming a plurality of processors to process a plurality of video streams comprising frames of video, each of said plurality of processors being programmed to digitize a plurality of dismounts within said plurality of video streams, said plurality of processors being programmed to produce numerical characterizations for said plurality of dismounts in said frames of video of an enthalpy related to an energy of said plurality of dismounts and an entropy related to a discordance of motion of said plurality of dismounts with respect to a comparison of frames of video, whereby said frames of said plurality of video streams are numerically characterized for said enthalpy and said entropy;
wherein said plurality of processors are programmed to determine crowd region of influence related to a density of said dismounts, and a numerical value for a crowd temperature from said region of influence, a number of said dismounts, and said enthalpy and said entropy.

8. The method of claim 7, further comprising mounting said plurality of processors into a plurality of cameras that produce said plurality of video streams.

9. The method of claim 8, wherein said plurality of cameras comprises over 50 cameras, and further comprising a selector module operable to select a particular of said plurality of video streams based a plurality of threshold values for said numerical characterizations for said enthalpy and said entropy.

10. The method of claim 7, wherein each of said plurality of processors includes a detector module operable to detect and digitize said plurality of dismounts within said plurality of video feeds, and a crowd module which determines said numerical characterizations of said plurality of dismounts for said enthalpy and said entropy.

11. The method of claim 7, further comprising providing a detector module for each of said plurality of processors, wherein said detector module comprises a training module which detects initial test dismounts in a video which is known to comprise few or no dismounts, whereupon said initial test dismounts are subtracted from subsequently detected dismounts.

12. The method of claim 7, wherein said processors are Field Programmable Gated Arrays (FPGAs).

* * * * *